United States Patent [19]

Abusleme et al.

[11] Patent Number: 5,688,838
[45] Date of Patent: *Nov. 18, 1997

[54] PROCESS FOR PREPARING HYDROGEN-CONTAINING FLUOROPOLYMERS BY SUSPENSION (CO)POLYMERIZATION

[75] Inventors: Julio A. Abusleme, Saronno; Pier Antonio Guarda, Nole, both of Italy; Ralph De Pasquale, S. Augustine Beach, Fla.

[73] Assignee: Ausimont S.p.A., Milan, Italy

[*] Notice: The term of this patent shall not extend beyond the expiration date of Pat. No. 5,510,435.

[21] Appl. No.: 508,926

[22] Filed: Jul. 28, 1995

[30] Foreign Application Priority Data

Aug. 4, 1994 [IT] Italy .................... MI94A1699

[51] Int. Cl.$^6$ ........................ C08F 2/46
[52] U.S. Cl. .................. 522/33; 522/5; 522/74; 522/84; 526/243; 526/249; 526/250; 526/255
[58] Field of Search ................ 522/33, 5, 74, 522/84; 526/243, 249, 250, 255

[56] References Cited

U.S. PATENT DOCUMENTS

| | | |
|---|---|---|
| 2,912,373 | 11/1959 | Carlson . |
| 3,193,539 | 7/1965 | Hauptsehein . |
| 3,475,396 | 10/1969 | McCain et al. . |
| 3,624,250 | 11/1971 | Carlson . |
| 4,243,770 | 1/1981 | Tatemoto et al. ............ 526/249 |
| 4,513,129 | 4/1985 | Nakagawa et al. ........... 526/249 |
| 4,524,194 | 6/1985 | Dumoulin ..................... 526/84 |
| 4,631,326 | 12/1986 | Koishi et al. ................. 526/249 |
| 4,739,024 | 4/1988 | Moggi et al. ................. 526/216 |
| 5,182,342 | 1/1993 | Feiring et al. ................ 526/206 |
| 5,510,435 | 4/1996 | Abusleme et al. ............ 526/207 |

FOREIGN PATENT DOCUMENTS

| | | |
|---|---|---|
| 0 185 242 A2 | 6/1986 | European Pat. Off. . |
| 0 253 400 A2 | 1/1988 | European Pat. Off. . |
| 0 612 767 A1 | 8/1994 | European Pat. Off. . |
| 0 617 058 A1 | 9/1994 | European Pat. Off. . |
| 0 650 982 A1 | 5/1995 | European Pat. Off. . |
| 2081727 | 2/1982 | United Kingdom . |

*Primary Examiner*—Mark Chapman
*Attorney, Agent, or Firm*—Bryan Cave LLP

[57] ABSTRACT

Process for preparing hydrogen-containing fluoropolymers, wherein the corresponding olefinic monomers are (co) polymerized in an organic suspending medium in the presence of a radical photoinitiator and of ultraviolet-visible radiation at a temperature of from −60° C. to +30° C. Hydrogen-containing fluoropolymers are thus obtained having high second melting temperature and high maximum operating temperature, using as initiators non-hazardous products, which can be easily handled and kept also at room temperature.

9 Claims, No Drawings

PROCESS FOR PREPARING HYDROGEN-CONTAINING FLUOROPOLYMERS BY SUSPENSION (CO)POLYMERIZATION

The present invention relates to a process for preparing hydrogen-containing fluoropolymers by (co)polymerization of the corresponding monomers in suspension.

Various kinds of hydrogen-containing fluorinated polymers are known. A first class consists of copolymers of per(halo)-fluoroolefins with olefinic monomers not containing halogens, such as copolymers of tetrafluoroethylene (TFE) or chlorotrifluoroethylene (CTFE) with ethylene, propylene or isobutylene, optionally containing a third fluorinated comonomer in amounts of from 0.1 to 10% by moles (see for instance U.S. Pat. No. 3,624,250 and U.S. Pat. No. 4,513,129). Such polymers are endowed with high chemical and mechanical resistance at high temperatures and are used for manufacturing articles by extrusion or injection moulding or for electric wire coating. To favour comonomer alternation, preparation of such copolymers is generally carried out at low temperatures; for instance, ethylene/CTFE copolymers are usually prepared in suspension at a temperature of from 5° to 25° C. In such a way formation of non-halogenated monomer blocks is avoided; which, besides causing a worsening of mechanical properties, make the product thermally unstable, producing a substantial lowering both of the second melting temperature and of the maximum operating temperature (rating temperature).

The use of so low polymerization temperatures implies choosing the initiator within a rather restricted class of peroxides which are active at low temperatures, such as bisacylperoxides of formula $(R_f—CO—O)_2$, wherein $R_f$ is a $C_1$–$C_{10}$ (per)haloalkyl (see for instance EP patent No. 185,242 and U.S. Pat. No. 3,624,250). For instance, the most commonly used initiator for preparing ethylene/CTFE copolymers is bis-trichloroacetyl-peroxide (TCAP), which has a half-life time at −3.9° C. of 10 hours, and, moreover, gives end groups which are thermally not very stable with consequent problems of discoloration of the polymer at high temperatures.

Generally, these peroxides are extremely hazardous products, being explosive also at low temperatures, particularly in the pure state. Therefore, they require adoption of particular safety measures both for synthesis and for shipping and storage; for instance they must be prepared and used in the form of a solution diluted in a suitable organic solvent. The use of organic solvents is a considerable drawback from the point of view of plant construction and implies environmental impact problems, especially considering that the most suitable solvents are chlorofluorocarbons, which are stratosphere ozone depleting substances. Moreover, the fact of introducing into the reactor a considerable amount of solvent causes a dilution of the system and thus a slackening in reaction kinetics and a change in monomer concentration with consequent variation in polymer composition.

Another class of hydrogen-containing fluoropolymers is constituted by polyvinylidenefluoride (PVDF) and PVDF modified with small amounts (0.1–10% by moles) of other fluorinated comonomers, such as hexafluoropropene, terafluoroethylene, trifluoroethylene. Such polymers are usually prepared by polymerization in an aqueous medium, using organic or inorganic peroxides as initiators. The most commonly used initiators are ditertbutylperoxide (DTBP) with polymerization temperatures of about 120°–130° C. (see U.S. Pat. No. 3,193,539) and diisopropylperoxydicarbonate (IPP) when the polymerization is to be carried out at lower temperatures (around 65°–85° C.) (see U.S. Pat. No. 3,475,396). Also in this case operating at relatively high temperatures leads to a decrease both in the second melting temperature and in the maximum operating temperature of the polymer. This is mainly due to an increase of structural defects, in particular of head-to-head and tail-to-tail monomeric inversions, with consequent decrease of the crystallinity percentage.

The Applicant has now surprisingly found that it is possible to obtain hydrogen-containing fluoropolymers endowed with high second melting temperature and high maximum operating temperature by means of a suspension (co)polymerization process, in the presence of radical photoinitiators and of ultraviolet-visible radiation, at a temperature of from −60° to +30° C. In such a way, it is possible to use as initiators non-hazardous products which can be easily handled and kept also at room temperature.

Therefore, object of the present invention is a process for preparing hydrogen-containing fluoropolymers, wherein the corresponding olefinic monomers are (co)polymerized in an organic suspending medium in the presence of a radical photoinitiator and of ultraviolet (UV)-visible radiation at a temperature of from −60° to +30° C., preferably from −40° to 20° C., more preferably from −15° to +15° C.

The process object of the present invention is carried out in suspension, namely without any surfactant. The suspending medium can be formed by the monomers themselves, in the case at least one of them is liquid in the reaction conditions (this is for instance the case of CTFE copolymers wherein CTFE is liquid in the usually employed reaction conditions). Alternatively, a suitable organic solvent can be used as suspending medium, which can be selected for instance from: chlorofluorocarbons, such as trichlorotrifluoroethane, dichlorotetrafluoroethane, etc.; hydrogen(chloro) fluorocarbons, optionally containing oxygen atoms, such as those described in U.S. Pat. No. 5,182,342; (per) fluoropolyoxyalkylenes, optionally containing hydrogen atoms in terminal position and/or along the chain (see European patent application EP-A-617,058); branched aliphatic hydrocarbons having from 6 to 25 carbon atoms and characterized by a ratio between number of methyl groups and number of carbon atoms greater than 0.5 (as described in European patent application EP-A-612,767), such as 2,3-dimethylbutane, 2,3-dimethylpentane, 2,2,4-trimethyl-pentane, 2,2,4,6,6-pentamethylheptane, 2,2,4,4,6-pentamethyl-heptane, etc.

To the suspending medium water can be added, which has the function of dispersing the heat developing during reaction.

By "radical photoinitiators" it is meant all of the chemical species, soluble in the organic phase, which, when submitted to UV-visible radiation, generate radicals capable of initiating (co)polymerization of the relevant monomers. Among them, there are comprised: dialkylperoxides, for instance ditertbutylperoxide; ketones, for instance, acetone; diacylperoxides, such as diacetylperoxide; di- or polyketones, for instance biacetyl; peroxydicarbonates, for instance bis(4-tertbutylcyclohexyl)peroxydicarbonate; peroxyesters, for instance tertbutylperoxyisobutyrate; halogenated or polyhalogenated organic compounds, for instance alkylhalides $C_nX_qF_rH_{2n+2-q-r}$, wherein: X is a halogen selected from Cl, Br and I; n is an integer from 1 to 10; r and q are integers, r can be zero while q is always different from zero, the r+q sum is from 1 to 2n+2 (for instance, $CF_2Br_2$, $CH_2I—CH_2I$, $CHCl_3$, $CH_2Br_2$, etc, are within this class).

From an operative viewpoint, photoinitiators thermally stable at the polymerization temperature and also at room temperature are preferred, and among them organic peroxides having a half-life time of 10 hours at a temperature equal to or higher than 40° C. are particularly preferred, such as ditertbutylperoxide (DTBP), bis(4-tertbutylcyclohexyl) peroxydicarbonate, dilauroylperoxide, tertbutylperoxyisobutyrate, etc.

With respect to the processes known in the art, the process object of the present invention allows to select the initiator within a very wide range. This is an outstanding advantage since it makes possible the use of initiators, generally unsuitable with the methods known until now, which form particularly stable chain end-groups, for instance ditertbutylperoxide and acetone, which give methyl end-groups.

As to UV-visible radiation, it is provided to the reaction system by means of a suitable emission source, according to conventional techniques commonly employed for photochemical reactions, for instance by means of a high pressure mercury lamp. The UV-visible radiation wavelength suitable for the process object of the present invention is generally comprised between 220 and 600 nm. It is to be pointed out that using radiation for generating radicals generally allows a better control of reaction kinetics, and in particular, in the case of polymerization runaway, it is possible to turn out the radiation source immediately and therefore to stop the reaction; this is clearly impossible when thermal initiators are employed.

The process object of the present invention can be carried out within a wide pressure range, generally comprised between 0.5 and 80 bar, preferably between 2 and 20 bar.

To the reaction mixture chain transfer agents can be added, such as: hydrogen; hydrocarbons or fluorohydrocarbons (for instance methane or ethane); ethyl acetate; diethylmalonate; cyclopentanes alkylsubstituted with one or more $C_1$-$C_6$ alkyls, for instance methylcyclopentane, 2-methyl-1-ethylcyclopentane, etc. (as described in Italian patent application No. MI94A/000520, filed on Mar. 21, 1994 in the name of the Applicant, corresponding to European patent application No. 95103469.5).

By hydrogen-containing fluoropolymers it is generally meant copolymers of one or more per(halo)fluoroolefins (for instance tetrafluoroethylene, chlorotrifluoroethylene, hexafluoropropene, perfluoroalkylvinylethers, etc.) with a non-halogenated olefin (for instance ethylene, propylene, vinylethers, etc.), or homopolymers of hydrogen-containing fluorinated olefins (for instance vinylidenefluoride, trifluoroethylene, etc.) and their copolymers with per(halo)fluoroolefins and/or non-halogenated olefins.

Particularly, the process object of the present invention can be used for preparing the following hydrogen-containing fluoropolymers:

(a) TFE or CTFE copolymers with ethylene, propylene or isobutylene (preferably ethylene), with a molar ratio fluorinated monomer/non-halogenated monomer of from 30:70 to 70:30, optionally containing one or more fluorinated comonomers in amounts of from 0.1 to 10% by moles (see for instance U.S. Pat. No. 3,624,250 and U.S. Pat. No. 4,513,129);

(b) curable copolymers of TFE and/or CTFE with non-fluorinated vinylethers, such as for instance the copolymers (% by moles): (i) 40–60% of TFE and/or CTFE; 5–45% of cyclohexylvinylether; 5–45% of an alkylvinylether; 3–15% of a hydroxyalkylvinylether (see for instance GB-2,081,727); (ii) 25–75% of CTFE; 10–70% of an alkylvinylether; 3–40% of an hydroxyallylether of formula $CH_2$=CH—$CH_2$—O—($CH_2CH_2O$)$_n$—H (see U.S. Pat. No. 4,631,326).

(c) polyvinylidenefluoride (PVDF) or modified PVDF containing small amounts, generally comprised between 0.1 and 10% by moles, of one or more fluorinated comonomers, such as vinylfluoride, chlorotrifluoroethylene, hexafluoropropene, tetrafluoroethylene, trifluoroethylene, etc. (see for instance U.S. Pat. No. 4,524,194 and U.S. Pat. No. 4,739,024).

Some working examples are reported hereinbelow, whose purpose is merely illustrative but not limitative of the scope of the invention.

EXAMPLE 1

On the lateral wall of a 0.6 l AISI 316 stainless steel autoclave, equipped with a stirrer working at 900 rpm, a quartz window was inserted, in correspondence of which an UV lamp of type Hanau® TQ-150 was installed. It is a high pressure mercury lamp emitting radiation from 220 to 600 nm, with a power of 13.2 W for radiation from 240 to 330 nm.

The autoclave was evacuated and 213.4 ml of isooctane were introduced. The temperature was brought to and kept at 10° C., while the pressure was raised to 9.3 bar by immission of tetrafluoroethylene (TFE). Ethylene was subsequently introduced until an operating pressure of 14.1 bar was reached. The UV lamp was then switched on and at the same time feeding was started of a solution formed by 5.0 g of ditertbutylperoxide (DTBP) and 100 ml of isooctane, with a capacity of 0.5 ml each 10 minutes. The total volume of peroxide solution introduced was 10 ml. The pressure of 14.1 bar was kept constant for the whole reaction duration by continuously feeding a gaseous ethylene/TFE mixture in molar ratio 49/51. After 420 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum oven for 10 hours. 19.2 g of dry polymer were so obtained. A Melt Flow Index (MFI) equal to 4.4 g/10' was measured thereon (according to ASTM D-3159-83 standard, except that the measurement temperature was fixed at 300° C. instead of 297° C., because of the very high second melting temperature both of the obtained product in this example, and of the products of Examples 2–3).

EXAMPLE 2

In the same autoclave of Example 1, 110.0 ml of isooctane were introduced after evacuation. The temperature was brought to and kept at 10° C. while the pressure was raised to 15.5 bar by immission of TFE. Subsequently ethylene was introduced until an operating pressure of 23.1 bar was reached. The UV lamp was then switched on and at the same time feeding was started of a solution formed by 10.0 g of DTBP and 100 ml of isooctane, with a capacity of 0.5 ml every 10 minutes. The total volume of peroxide solution introduced was 20 ml. The pressure of 23.1 bar was kept constant for the whole reaction duration by continuously feeding a gaseous ethylene/TFE mixture in molar ratio 49/51. After 360 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum stove for 10 hours. 17.0 g of dry polymer were so obtained. The MFI resulted not measurable because of the poor fluidity. The second melting temperature $T_m$(II) (measured by Scanning Differential Calorimetry, DSC) was equal to 297.5° C.

EXAMPLE 3

Example 2 was repeated, except that, before starting the reaction, 5.0 ml of methylcyclopentane were introduced into the autoclave as chain transfer agent. After 410 min, 27.2 g of dry polymer, having MFI=2.2 g/10' and $T_m$(II)=297.0° C., were obtained.

EXAMPLE 4

In the same autoclave of Example 1, 135.0 ml of isooctane were introduced after evacuation. The temperature was brought to and kept at 10° C. while the pressure was raised to 15.5 bar by immission of TFE. Ethylene was subsequently introduced until an operating pressure of 23.1 bar was reached. The UV lamp was then switched on and at the same time feeding was started of acetone with a capacity of 0.5 ml each 10 minutes. The total volume of acetone introduced was 10 ml. The pressure of 23.1 bar was kept constant for the whole reaction duration by continuously feeding a gaseous ethylene/TFE mixture in molar ratio 49/51. After 330 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum oven for 10 hours. 2.2 g of dry polymer were so obtained.

EXAMPLE 5

In the same autoclave of Example 1, 110.0 ml of CFC-113 ($CCl_2F$—$CClF_2$) and 100 ml of demineralized water were introduced after evacuation. CFC-113 acts both as solvent and as initiator. The temperature was brought to and kept at 10° C. while the pressure was raised to 15.5 bar by immission of TFE. Ethylene was then introduced until an operating pressure of 23.1 bar was reached. The UV lamp was then switched on. The pressure of 23.1 bar was kept constant for the whole reaction duration by continuously feeding a gaseous ethylene/TFE mixture in molar ratio 49/51. After 420 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum stove for 10 hours. 8.02 g of dry polymer, having $T_m$(II)=298° C. and a content in ethylene, determined by carbon elementary analysis, equal to 48.8% by moles, were so obtained.

EXAMPLE 6

In the same autoclave of Example 1, 213.4 ml of GALDEN® D02, having formula $CF_3O$—$(CF_2CF(CF_3)O)_m(CF_2O)_n$—$CF_3$ having m/n=20 and number average molecular weight of 450 were introduced after evacuation. The temperature was brought to and kept at 10° C. while the pressure was raised to 4.4 bar by introduction of TFE. Ethylene was then introduced until an operating pressure of 7.2 bar was reached. The UV lamp was then switched on and at the same time chloroform was fed with a flow of 0.5 ml each 10 min. The total volume of fed chloroform was 10 ml. The pressure of 7.2 bar was kept constant for the whole reaction duration by continuously feeding a gaseous ethylene/TFE mixture in molar ratio 49/51. After 420 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum oven for 10 hours. 2.0 g of dry polymer were so obtained.

EXAMPLE 7

In the same autoclave of Example 1, 135.0 ml of CFC-113 ($CCl_2F$—$CClF_2$) were introduced after evacuation. CFC-113 acts as solvent and as initiator. The temperature was brought to and kept at −40° C. while the pressure was raised to 3.2 bar by immission of TFE. Ethylene was subsequently introduced until an operating pressure of 5.7 bar was reached. The UV lamp was then switched on. The pressure of 5.7 bar was kept constant for the whole reaction duration by continuously feeding a gaseous ethylene/TFE mixture in molar ratio 49/51. After 390 minutes the lamp was switched off; the monomers and part of the solvent were removed by means of a nitrogen flow directly introduced into the autoclave. The content of the autoclave was then discharged at room temperature and the residual solvent removed by heating at 150° C. in a vacuum oven for 10 hours. 2.0 g of dry polymer were so obtained, having $T_m$(II)=309° C. and a content in ethylene, determined by carbon elemental analysis, of 49.8% by moles.

EXAMPLE 8

In the same autoclave of Example 1, 225.0 ml of isooctane were introduced after evacuation. The temperature was brought to and kept at −10° C. and 65 g of chlorotrifluoroethylene (CTFE) were charged. Ethylene was then introduced until an operating pressure of 3.0 bar was reached. The UV lamp was then switched on and at the same time feeding was started of a solution formed by 5.0 g of DTBP and 150 ml of isooctane with a capacity of 0.5 ml each 5 min. The total volume of fed peroxide solution was 20 ml. The pressure of 3.0 bar was kept constant for the whole reaction duration by continuously feeding ethylene. After 335 minutes the lamp was switched off; the monomers and part of the isooctane were removed by means of a nitrogen flow directly introduced into the autoclave. The content of the autoclave was then discharged at room temperature and the residual solvent removed by heating at 120° C. in a vacuum oven for 10 hours. 24.0 g of dry polymer were so obtained, having MFI=19.9 g/10' (measured according to ASTM D-3275-89 standard), $T_m$(II)=247.3° C. and an ethylene content (determined by carbon elemental analysis) of 50.4% by moles.

EXAMPLE 9

Example 8 was repeated, setting up a reaction temperature of −30° C. and an operating pressure of 2.0 bar. After 300 min, 8.0 g of ethylene/CTFE polymer, having an ethylene content of 49% by moles, were obtained.

EXAMPLE 10

In the same autoclave of Example 1, 300 ml of demineralized water were introduced after evacuation. The temperature was brought to and kept at 5° C. and 80 g of VDF were charged until a pressure of 24.5 bar was reached. The UV lamp was then switched on and at the same time it was started to feed, with a capacity of 0.15 ml/min during the whole reaction, a solution formed by 5.0 g of ditertbutylperoxide (DTBP) and 100 ml of a fluoropolyoxyalkylene containing hydrogen atoms in terminal position, having the formula:

wherein $R_f$ is —$CF_3$, —$CF_2CF_3$, —$CF_2CF_2CF_3$, —$CF(CF_3)$ $CF_3$; R' is —OCFH—$CF_3$, —$OCF_2H$ (in a 50:1 ratio), having number average molecular weight of 400 and with a hydrogen atom content of 150 ppm.

The pressure was kept constant, at about 24 bar, by adding VDF. After 95 minutes the lamp was switched off, the remaining monomer and part of the fluoropolyoxyalkylene removed by means of a nitrogen flow directly introduced into the autoclave. The content of the autoclave was then discharged at room temperature, the remaining water and fluoropolyoxyalkylene removed by drying in a vacuum oven at 100° C. for 10 hours. 9.5 g of polymer having $T_m(II)$= 177.0° C. were so obtained. The VDF units showed a percentage of head-to-head and tail-to-tail inversions (determined by $^{19}$F-NMR analysis) equal to 3.5% by moles.

EXAMPLE 11

In the same autoclave of Example 1, 220 ml of demineralized water were introduced after evacuation. The temperature was brought to and kept at 5° C., and 80 g of VDF and 125 g of HFP were loaded until a pressure of 15.9 bar was reached. The UV lamp was then switched on and at the same time feeding was started, with a capacity of 0.1 ml/min during the whole reaction of a solution formed by 5.0 g of ditertbutylperoxide (DTBP and 100 ml of the same fluoropolyoxyalkylene containing hydrogen atoms used in Example 10.

The pressure was kept constant, at about 15.9 bar, by adding a gaseous mixture formed by VDF and HFP in molar ratio 90/10. After 200 min the lamp was switched off, the remaining monomers and part of the fluoropolyoxyalkylene removed by means of a nitrogen flow directly introduced into the autoclave. The content of the autoclave was then discharged at room temperature, the remaining water and the fluoropolyoxyalkylene removed by drying in a vacuum oven at 100° C. for 10 hours. 10.0 g of polymer were so obtained, having a composition, determined by $^{19}$F-NMR, equal to 87.9% by moles of VDF and 12.1% by moles of HFP, and $T_m(II)$=168.0° C. The VDF units showed a percentage of head-to-head and tail-to-tail inversions equal to 3.5% by moles.

We claim:

1. A process for preparing hydrogen-containing fluoropolymers, said process consisting essentially of (co) polymerizing hydrogen-containing olefinic monomers or a combination of hydrogen-containing and non-hydrogen containing olefinic monomers in an organic suspending medium in the presence of (a) a radical photoinitiator selected from the group consisting of dialkylperoxides, ketones, diacylperoxides, di or polyketones, peroxydicarbonates, peroxyesters, and halogenated or polyhalogenated organic compounds wherein the halogens are selected from the group consisting of F, Cl and Br, and (b) ultraviolet (UV)-visible radiation at a temperature of from –60° to +30° C., with the proviso that said olefinic monomers do not have any halogens other than fluorine or chlorine.

2. Process according to claim 1, wherein the reaction temperature is from –40° to +20° C.

3. Process according to claim 1, wherein the radical photoinitiator is an organic peroxide having an half-life time of 10 hours at a temperature equal to or higher than 40° C.

4. Process according to claim 1, wherein the radical photoinitiator is selected from: ditertbutylperoxide and alkylhalides $C_nX_qF_rH_{2n+2-q-r}$, wherein X is a halogen selected from Cl and Br; n is an integer from 1 to 10; r and q are integers, r can be zero while q is always different from zero, and the sum r+q is from 1 to 2n+2.

5. Process according to claim 1, wherein at least one of the monomers is a liquid under the polymerization conditions and functions as the suspending medium.

6. Process according to claim 1, wherein the suspending medium is an organic solvent selected from: chlorofluorocarbons; hydrogen(chloro)fluorocarbons, optionally containing oxygen atoms; (per) fluoropolyoxyalkylenes, optionally containing hydrogen atoms in terminal position and/or along the chain; and branched aliphatic hydrocarbons having from 6 to 25 carbon atoms and characterized by a ratio between the number of methyl groups and the number of carbon atoms greater than 0.5.

7. Process according to claim 1, wherein water is added to the suspending medium.

8. Process according to claim 1, wherein the UV-visible radiation has a wavelength of from 220 to 600 nm.

9. Process according to claim 1, wherein the hydrogen-containing fluoropolymer is selected from:

(a) copolymers of tetrafluoroethylene (TFE) or chlorotrifluoroethylene (CTFE) with ethylene, propylene or isobutylene, with a molar ratio fluorinated monomer/non-halogenated monomer of from 30:70 and 70:30, optionally containing one or more fluorinated comonomers in amounts of from 0.1 to 10% by moles;

(b) curable copolymers of TFE and/or CTFE with non-fluorinated vinylethers; and (c) polyvinylidenefluoride (PVDF) or modified PVDF containing between 0.1 and 10% by moles, of one or more fluorinated comonomers.

* * * * *